(No Model.)
E. A. LELAND.
BRAKE HOSE COUPLING.
No. 426,824. Patented Apr. 29, 1890.
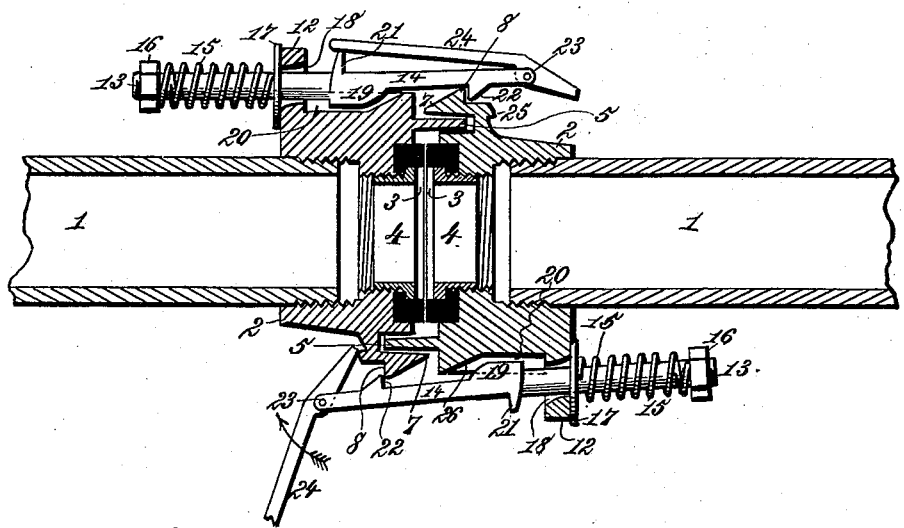
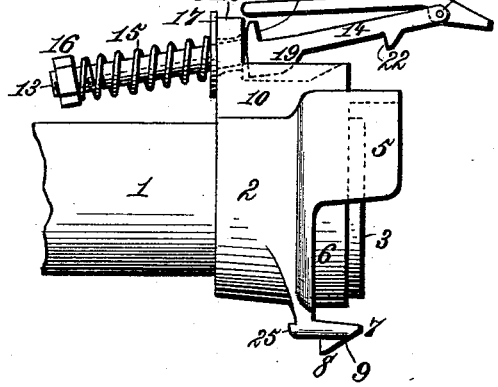
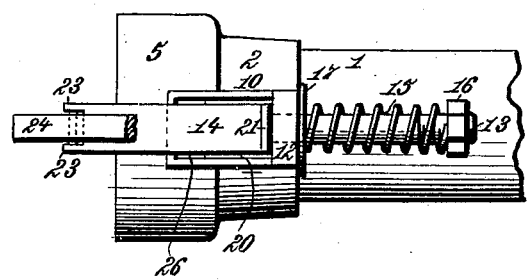
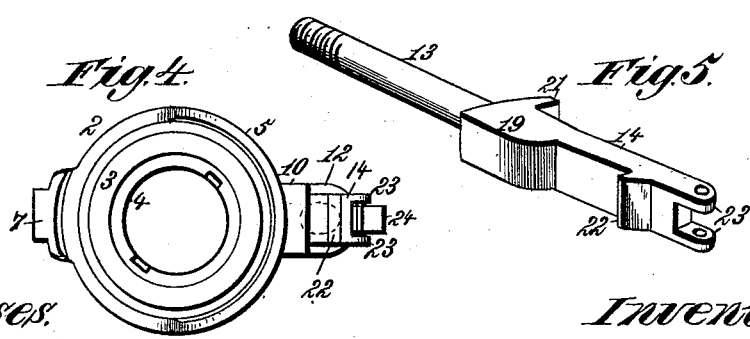
Witnesses:
Robert Everitt,
J. G. Myers Jr
Inventor:
Edwin A. Leland,
By James L. Norris,
Atty.
THE NORRIS PETERS CO., PHOTO-LITHO., WASHINGTON, D. C.

United States Patent Office.

EDWIN A. LELAND, OF BROOKLYN, NEW YORK, ASSIGNOR TO LEONARD RICHARDSON, OF SAME PLACE.

BRAKE-HOSE COUPLING.

SPECIFICATION forming part of Letters Patent No. 426,824, dated April 29, 1890.

Application filed November 27, 1889. Serial No. 331,831. (No model.)

*To all whom it may concern:*

Be it known that I, EDWIN A. LELAND, a citizen of the United States, residing at Brooklyn, in the county of Kings and State of New York, have invented new and useful Improvements in Brake-Hose Couplings, of which the following is a specification.

My invention relates to that class of couplings employed for connecting the air or steam pipes used upon railway-cars for operating the brakes or heating the interior.

It is the purpose of my invention to provide simple means for connecting the coupling-heads, which shall be automatically-cast off or detached by simply pulling the cars apart or upon the breaking of the train at any point.

It is my purpose, also, to provide a coupling of this type with connecting devices, which are automatically thrown upon disengagement into a position permitting the union of the coupling-heads without interference with such devices.

It is my further purpose to simplify and improve the construction, organization, and operation of this class of couplings by combining therewith an automatically cast-off connecting device, maintaining the union by an elastic strain, and provided with means whereby such device may be thrown into engagement with the elastic tension acting in a line substantially parallel with the axis of the coupling, whereas when cast off or disengaged it shall act at an angle thereto, and maintain the connecting device in a position permitting the union of the coupling-heads without coming in contact with said devices.

The invention consists in the several novel features of construction and new combinations of parts hereinafter fully set forth, and then definitely pointed out in the claims following this specification.

To enable others skilled in the art to practice my said invention, I will describe the same in detail, reference being had to the accompanying drawings, in which—

Figure 1 is a central longitudinal section of a united coupling, showing my invention. Fig. 2 is a plan view of one of the coupling-heads detached or separated from the other. Fig. 3 is a side elevation of the coupling-head engaging with that shown in Fig. 2. Fig. 4 is an end elevation of one of the coupling-heads. Fig. 5 is a detail view in perspective of one of the connecting devices detached from the coupling-head and having its engaging lever and spring removed.

In the said drawings, the reference-numeral 1 denotes the hose-sections attached to the ends of the train-pipes, to afford the requisite elastic or flexible connections between the cars. Upon the end of each hose-section is mounted a coupling-head 2, having a packing-ring 3 inserted in a countersunk recess surrounding the opening and confined therein by a collar-nut 4, screwed into the said opening. Upon each coupling-head is formed an exterior forwardly-projecting semicircular shell 5, alternating in position with the similar shell upon the other coupling-head. Each of these shells partly incloses the packing-ring 3 in the same head, being slightly separated from the outer edge of said ring. Upon that half of each coupling-head not surrounded by the shell the metal is cut away to form a seat 6 for the shell upon the opposite coupling-head.

Upon each member of the coupling, diametrically opposite the center of the shell 5, is formed a lug 7, which projects in the same direction as the shell and lies at a short distance outside the seat 6, with which its inner face forms a very small angle, diverging or expanding outwardly to admit the edge of the shell upon the opposite coupling-head and admit and guide it readily to the seat 6. Upon the outer face of the lug is formed a latch-hook 8, having its angular lifting-surface 9 rising from the front toward the rear.

Upon the outer face of each coupling-head opposite the lug 7 is a bracket 10, having an outwardly-projecting ring 12 at its rearward end, through which passes the spindle 13 of a latch-bar 14. The spindle is of sufficient length to receive a powerful coiled spring 15, which is confined at one end by an adjustable nut 16 and at the other end by a washer 17, slipped on the spindle and bearing against the ring 12 and the end of the bracket 10. The opening 18 in the ring is expanded in two directions, to enable the latch-bar to swing outward away from the coupling. Upon the latch-bar in front of the ring 12 is an inwardly-projecting lug 19, which lies in a longitudinal recess 20 in the bracket 10, whereby longitudinal movement of the latch-bar is permitted, but rotary movement prevented. At the base of this lug is a toe or projection 21, the rear face of which, as well as of the corresponding end of the lug 19, is beveled off at an angle with the spindle 13 of more than a right angle, whereby the tension of the spring 15, drawing this beveled surface against the forward face of the ring 12, will throw the latch-bar outward, as shown in Fig. 2.

Upon the forward end of the latch-bar 14 is formed a latch-hook 22, which is adapted to engage the latch-hook 8 upon the opposite coupling. The parts are so proportioned that, to effect this engagement, the spring 15 on the spindle of the latch-bar must be placed under sufficient tension to compress the packing-rings 3 and form a close and tight joint. For this purpose I prolong the end of the latch-bar somewhat beyond the latch-hook 22 and bifurcate it. Between the arms 23 thus formed I pivot a latching-lever 24, having its end projecting somewhat beyond the point of pivotal attachment. When the coupling is brought together, this lever is swung over, its nose catching beneath a lip 25 on the rearward face of the lug 7, whereby the latch-bar is drawn forward and its hook thrown downward over the latch-hook 8, the action of the lever being shown in Fig. 1. When unemployed, the lever is turned backward as nearly as possible into parallelism with the latch-bar.

The longitudinal recess 20 in the bracket 10 is provided at its forward end with an incline 26, by which the recess becomes shallower as it proceeds toward the forward end of the coupling. The projecting lug 19 on the latch-bar is also rounded or inclined upon its forward end, whereby any strain which is sufficient to separate the coupling-heads and compress the springs 15 will cause the lug 19 to ride up on the incline 26 and throw the hook 22 off the hook 8. The tension of the spring 15 immediately snaps the latch-bar rearward, bringing the beveled rear face of the toe 21 against the flat face of the ring 12, thereby projecting the free end of the latch-bar outward in the position shown in Fig. 2. It will be seen, therefore, that the release of the coupling is effected by simply uncoupling the cars and drawing them apart.

By adjusting the nut 16 the tension of the spring 15 may be varied to any required degree, and the force with which the coupling-heads are drawn together may be increased or diminished as circumstances require. The washers 17 are held constantly against the rear faces of the rings 12 and afford broad and even surfaces for the ends of the springs 15 at the same time that they freely permit the outward swing of the latch-bars.

The invention may be used upon telescoping pipes or any other form of air or steam pipes used upon railway-cars.

Each coupling-head is the counterpart of that described, in every particular.

What I claim is—

1. In a brake-hose or other coupling, the combination, with separable hooked coupling-heads having side bearings, of lengthwise-sliding and laterally-swinging hooked latch-bars supported by said bearings, a spring engaging each latch-bar, acting to move it lengthwise and permitting the lateral swing thereof, and a lever pivoted to each latch-bar for engaging the latter with a coupling-head, substantially as described.

2. In a brake-hose or other coupling, the combination, with separable coupling-heads having latch-hooks upon alternating sides, of latch-bars having hooks engaging therewith and provided with spindles movable longitudinally in rings on the coupling-heads, springs coiled on said spindles and retracting the latch-bars, and levers fulcrumed upon the ends of the latter, their points engaging lips in rear of the latch-hooks to effect the coupling engagement, substantially as described.

3. In a brake-hose or other coupling, the combination, with separable coupling-heads, of the latch-bars adjustable thereon against the tension of coiled springs to engage latch-hooks on the coupling-heads, said latch-bars being provided with inwardly-projecting lugs lying in longitudinal recesses with inclines at their forward ends, whereby the longitudinal forward movement of said lugs will swing said latch-bars away from the coupling, substantially as described.

4. In a brake-hose or other coupling, the combination, with two separable coupling-heads having alternating latch-hooks, of latch-bars having spindles movable longitudinally in rings upon alternate sides of the respective coupling-heads, and springs retracting said latch-bars, the latter being provided with rearwardly-beveled lugs or projecting toes drawn by said springs against the flat faces of the rings and swinging the latch-bars outward away from the coupling, substantially as described.

5. In a brake-hose or other coupling, the combination, with two separable coupling-heads, of latch-bars having spindles movable in rigid rings on the heads and provided with coiled springs bearing against adjustable nuts on said spindles and against washers thereon pressed against the rear faces of the rings, and means for engaging the latch-hooks on the bars with hooks on the coupling-heads, said latch-bars having inwardly-projecting lugs lying in longitudinal recesses in the coupling-heads, and having the bearing-surfaces inclined outward at their forward ends, said lugs having toes provided with beveled rearward faces drawn by the springs against the forward faces of the rings, substantially as described.

6. In a brake-hose or other coupling, the combination, with separable coupling-heads, each having a latch-hook and provided upon the side opposite said latch-hook with a bracket having a rigid ring, of latch-bars having spindles moving in said rings, springs coiled on said spindles and bearing against nuts adjustable thereon and against washers forced by said springs against the rear faces of the rings, levers fulcrumed between the bifurcated ends of the latch-bars and engaging lips on the rear faces of the latch-hooks to effect a coupling engagement, said latch-bars being provided with lugs having rounded or inclined angles, movable in longitudinal recesses in the brackets, said recesses having inclined bearing-surfaces at their forward ends, and the lugs of the latch-bars having beveled rearward surfaces drawn by the springs against the rigid rings, substantially as described.

In testimony whereof I have affixed my signature in presence of two witnesses.

EDWIN A. LELAND.

Witnesses:
JAMES GALLAGHER,
JOSEPH GALLAGHER.